(12) United States Patent
Calfee

(10) Patent No.: US 7,591,475 B1
(45) Date of Patent: Sep. 22, 2009

(54) SIMPLIFIED REAR SUSPENSION FOR A BICYCLE OR THE LIKE

(76) Inventor: Craig Calfee, 194 Seascape Ridge Dr., Aptos, CA (US) 95003

(*) Notice: Subject to any disclaimer, the term of this patent is extended or adjusted under 35 U.S.C. 154(b) by 0 days.

(21) Appl. No.: 12/112,334

(22) Filed: Apr. 30, 2008

Related U.S. Application Data

(60) Provisional application No. 60/940,180, filed on May 25, 2007.

(51) Int. Cl.
B62D 3/02 (2006.01)
(52) U.S. Cl. .................................................. 280/284
(58) Field of Classification Search .............. 280/284, 280/285, 286
See application file for complete search history.

(56) References Cited

U.S. PATENT DOCUMENTS

| | | | | |
|---|---|---|---|---|
| 564,319 | A | * | 7/1896 | Travis .................. 280/284 |
| 618,627 | A | * | 1/1899 | Travis .................. 280/284 |
| 708,202 | A | * | 9/1902 | Case .................... 280/284 |
| 2,283,671 | A | * | 5/1942 | Finlay et al. .......... 280/284 |
| 4,421,337 | A | * | 12/1983 | Pratt .................... 280/277 |
| 5,217,241 | A | * | 6/1993 | Girvin .................. 280/284 |
| 5,570,896 | A | * | 11/1996 | Collins ................. 280/284 |
| 5,797,613 | A | | 8/1998 | Busby |
| 5,865,456 | A | | 2/1999 | Busby et al. |
| 6,056,307 | A | * | 5/2000 | Busby et al. .......... 280/284 |
| 6,099,010 | A | * | 8/2000 | Busby .................. 280/284 |
| 6,109,637 | A | | 8/2000 | Kirk |
| 6,406,048 | B1 | | 6/2002 | Castellano |
| 6,932,371 | B2 | | 8/2005 | Perez |
| 7,168,726 | B2 | | 1/2007 | Klein |
| 7,374,191 | B1 | * | 5/2008 | Tseng .................. 280/284 |

* cited by examiner

Primary Examiner—Tony H. Winner
(74) Attorney, Agent, or Firm—Jonathan A. Small

(57) ABSTRACT

A simplified rear suspension for a bicycle or the like comprises a wishbone seatstay structure. The wishbone structure is provided with a first extension extending toward the seat junction. A low friction guide component, for example a spherical element, is provided at the distal end of the extension. A second extension is provided at the seat junction, with a hollow interior for receiving the guide component. The guide component slides with little friction and play within the hollow interior. A stop member may also be provided within the hollow interior, stopping travel of the guide component under load. Motion of the rear wheel (via dropout) relative to the main frame (e.g., from the terrain) is translated into motion of the guide component within the hollow interior. The chainstays, in a pivotless arrangement, provide a moment which acts as a spring, resisting the motion of the dropouts and providing shock absorption and/or damping for improved ride and control.

8 Claims, 5 Drawing Sheets

SIMPLIFIED REAR SUSPENSION FOR A BICYCLE OR THE LIKE

CROSS REFERENCE TO RELATED APPLICATIONS

The present disclosure relates to U.S. provisional patent application Ser. No. 60/940,180, titled "Simplified Rear Suspension for a Bicycle or the Like", filed May 25, 2007, which is incorporated by reference herein and to which priority is hereby claimed.

BACKGROUND OF THE INVENTION

1. Field of the Invention

The present invention is related to bicycle suspension systems, and more specifically to a simplified suspension employing an axially moveable seat-stay arrangement with chainstays operating as a spring/dampener.

2. Description of the Prior Art

There are many known bicycle frame designs which provide a degree of damped motion to the rear wheel, so that transmission of sudden dips, bumps, and terrain variations to the rider via the bicycle frame are reduced. These designs generally comprise a rigid main frame (the seat tube—top tube—head tube—down tube "diamond") with a pivoting swing arm assembly comprising the seatstays and chainstays. In certain arrangements the pedal crank assembly forms a portion of the main frame, and in others is forms a portion of the swing arm. A spring and elastomeric or fluid dampener combination is the traditional mechanism for shock absorption, although solid elastomeric, purely-liquid, gas, and other arrangements have been used in place of the spring and dampener "shock absorber". Some types of suspension systems provide the shock absorber arranged in the plane of the seatstays, often forming a coaxial leg of the seatstay "wishbone" or replacing one or more stays, while other types of suspension systems provide a shock absorber disposed within the main frame.

While true of many vehicles, light weight and simplicity of design are critical elements when selecting components for a bicycle. The majority of prior art rear-suspension bicycle frame arrangements have suffered from excessive weight, excessive complexity, or both. In order to reduce added parts, and hence weight and complexity, one class of rear suspension bicycle frames employ the beam formed by the chainstays and bottom bracket as the spring member of a shock absorber. The chainstays are rigidly attached, as opposed to pivotally attached, to the bottom bracket or other portions of the main frame. For this reason, we refer to such frame arrangements as a "pivotless" suspension. General examples of such pivotless suspension frames include U.S. Pat. No. 7,168,726 to Klein, U.S. Pat. No. 6,932,371 to Perez et al., U.S. Pat. No. 6,406,048 to Castelano, U.S. Pat. No. 6,109,637 to Kirk, U.S. Pat. No. 5,865,456 to Busby et al., and U.S. Pat. No. 5,797,613 to Busby.

One problem with current pivotless suspension frames is a need to provide enhanced rigidity during shock absorption. For example, there is a need to resist twist of the rear wheel about its radius as the wheel moves up and down during shock absorption. It is also important to resist motion along the axis of the of the wheel axle. And again, it is important to do so while minimizing weight and complexity.

Noteworthy is U.S. Pat. No. 7,168,726 to Klein, according to which a bushing is disposed between two portions of a seatstay wishbone. The bushing is rigidly attached to a first part (the wheel side) of the wishbone with a series of bolts. A linear, sliding extension bearing is rigidly attached to the bushing by the bolts. The sliding extension bearing is disposed inside the second part (the seat side) of the wishbone. The bushing serves as the shock absorber, and the sliding extension servers as a mechanism to provide the aforementioned rigidity. In this design, the chainstays also provide a certain degree of spring to the system, although the primary shock absorption is provided by the bushing.

The design disclosed in U.S. Pat. No. 7,168,726 suffers from several disadvantages. First, in any such system there will be a tendency of the sliding members to resist sliding, thus reducing the effectiveness of the shock absorption. This may be due to tightness of fit between components, dirt, rust, fluid or other material between the bearing and the inner wall of the tube in which it travels, pinching due to force applied off-axis to the angle of motion of the bearing (such as side deflection and torque), etc. From whichever source, the force resisting relative motion between the sliding members is referred to as stiction. The linear arrangement of the bearing according to U.S. Pat. No. 7,168,726 is very susceptible to stiction caused by of axis forces. Any such off-axis forces tend to cause the bearing to pinch inside the second part of the wishbone. U.S. Pat. No. 7,168,726 relies on flex of the bolt system and of the stays to compensate for the off-axis forces, not a function anticipated for in the design of these parts.

Second, there are a number of specialized parts required for the system disclosed in U.S. Pat. No. 7,168,726. Fabricating same for such an application means higher cost and more limited availability of such parts. Further, the structure of the bearing, comprised of parallel disks and a hollow connecting shaft, introduce several points of failure. For example, significant off-axis force can deform one or both disks, break the shaft and/or bolt holding the system together, deform or break the second wishbone part in which the bearing slides, etc. The high force per surface area of this arrangement increases the likelihood of failure. Exacerbating this problem is the fact that the design requires a hole be provided in, and perpendicular to the axis of, the bolt holding the assembly together. The mounting for the rear brake is introduced through this hole. This hole is a point of high stress during combined shock absorption and braking, thus another point of potential failure of the system. Any of these failure modes could introduce the dangerous condition of the rear wheel being inadequately supported by the stay arrangement.

Third, the system disclosed in U.S. Pat. No. 7,168,726 requires that the bushing be in contact with the first and second wishbone parts. This limits the extent of shock absorbing motion (travel) available to the rear wheel.

A second system of note is that disclosed by Castellano in U.S. Pat. No. 6,406,048. According to this system, a generally flat, vertically flexible, bifurcated chainstay serves as a spring, and a shock absorber in the seatstay arrangement absorbs shock and limits vertical deflection of the rear wheel. However, similar to U.S. Pat. No. 7,168,726, this system has a number of disadvantages. First, the shock-absorber system is comprised of planar parts designed for motion along the axis of the shock absorber. Any off-axis motion creates friction and binding of the parts forming the shock absorber. Second, in addition to the unique seatstay arrangement, the shock absorber requires numerous specialized parts. Such a shock absorber is expensive, heavy, and difficult to service. The many parts provide regions for dirt and grime accumulation. And as the number of elements increase, the chances of breakage or part failure increase. Third, the shock absorber is of the oil-filled type, requiring specialized maintenance skills, parts, tools, etc.

For these reasons and others, there is a need in the art for an improved pivotless rear suspension bicycle frame providing high reliability, low complexity, low cost, ease of installation and repair, high safety, and effective shock absorption. The present invention is designed to address each of the needs.

SUMMARY OF THE INVENTION

Accordingly, the present invention is directed to a pivotless rear suspension bicycle frame in which a low friction guide component is rigidly affixed to a first part (e.g., the wheel side) of a seatstay wishbone apparatus and slidably disposed within a second part (e.g., the seat side) of the seatstay wishbone. An elastomeric member may optionally be disposed within the second part of the seatstay wishbone to provide a stop and/or to fine tune the stiffness and travel of the shock absorption provided by the suspension.

According to one aspect of the invention, the low friction guide is a spherical component which accommodates a relatively large range of force vectors. Furthermore, contact surface area between the portions of the system sliding relative to one another are minimized. Thus, stiction is reduced and shock absorption increased as compared to the prior art.

Furthermore, the low friction guide member is robust (for example, as compared to relatively thin disks), and the accommodation for a large range of force vectors means fewer points of failure as compared to the prior art.

In addition, the system comprises a minimum of parts and a simple set up and replacement process. And, most elements of the frame are of standard type and are assemble by standard processes (e.g., no special chainstay arrangements, no special methods of attaching stays to the bottom bracket or dropouts, etc.) Thus, the need for the specialized and/or complex parts is reduced, thus reducing the cost and increasing the dependability of the system as well as minimizing weight added by the suspension system.

The above is a summary of a number of the unique aspects, features, and advantages of the present invention. However, this summary is not exhaustive. Thus, these and other aspects, features, and advantages of the present invention will become more apparent from the following detailed description and the appended drawings, when considered in light of the claims provided herein.

BRIEF DESCRIPTION OF THE DRAWINGS

In the drawings appended hereto like reference numerals denote like elements between the various drawings. While illustrative, the drawings are not drawn to scale. In the drawings.

DETAILED DESCRIPTION OF THE INVENTION

Figure 1:
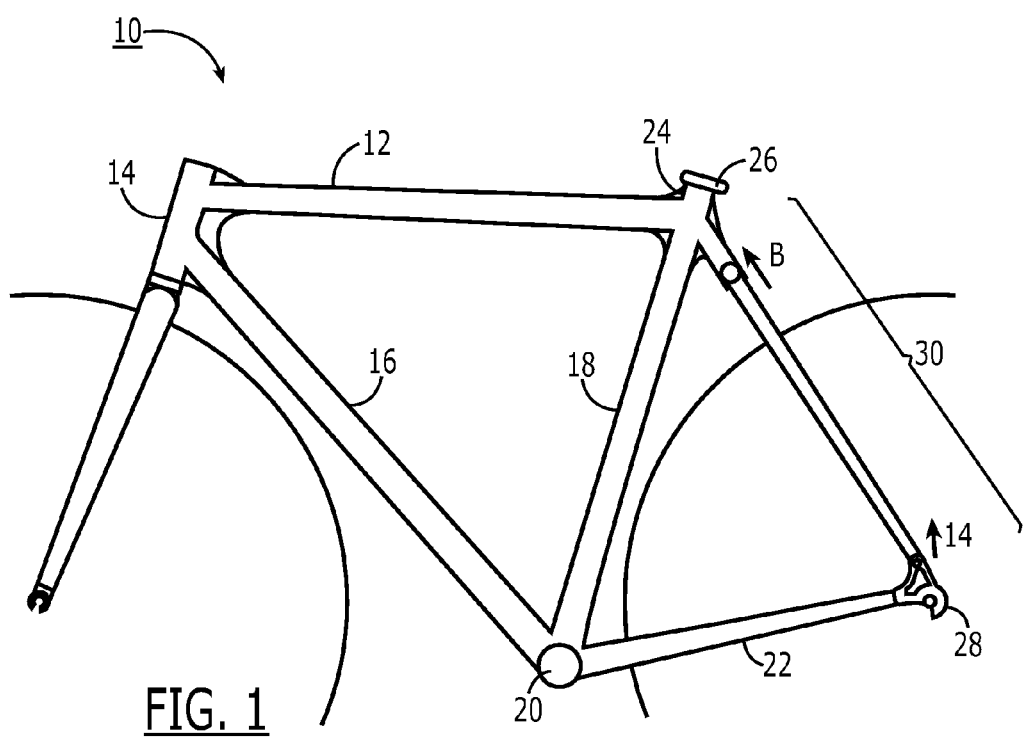
FIG. 1 is an illustration of a bicycle frame according to an embodiment of the present invention, illustrating the frame components and relative motion under load for such a frame.

With reference first to FIG. 1, a bicycle frame 10 (or similar structure) is comprised of a top tube 12 connected to a head tube 14, which is in turn connected to a down tube 16. Down tube 16 and a seat tube 18 are connected via a bottom bracket structure 20. Seat tube 18 and top tube 12 connect at a seat junction 24 such that a seat post (not shown) may be introduced into seat tube 18 and clamped in place by a clamping mechanism 26. A pair of chainstay tubes 22 are connected at a first end to bottom bracket structure 20, and at a second end to rear wheel dropouts 28. Connecting seat junction 24 and rear wheel dropout assembly 28 is seatstay arrangement 30. Optionally, chainstay tubes 22 are removably connected to rear wheel dropouts 28.

Figure 2:
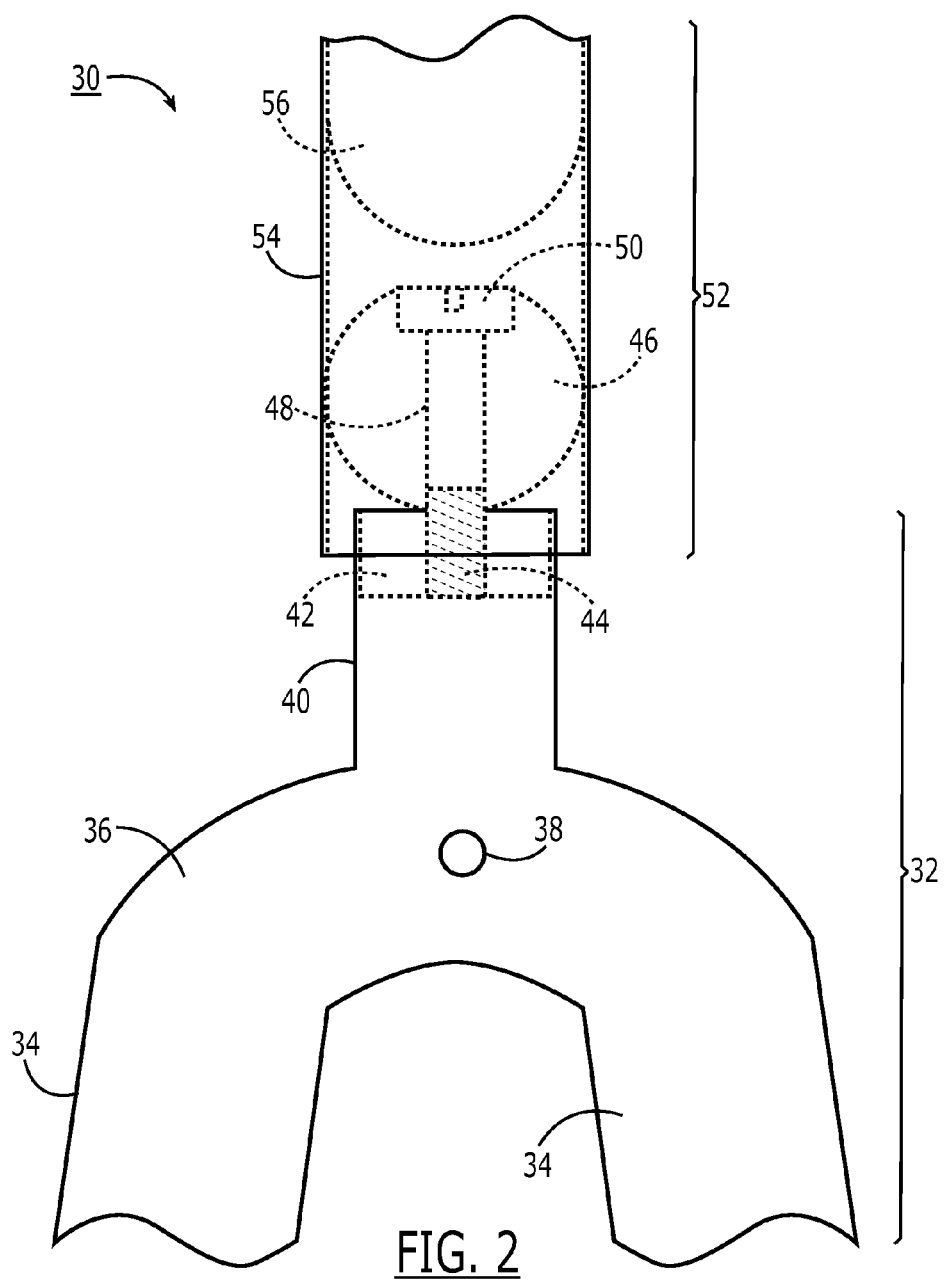
FIG. 2 is an illustration of a wishbone seatstay arrangement with extensions and spherical member according to an embodiment of the present invention.
Figure 3:
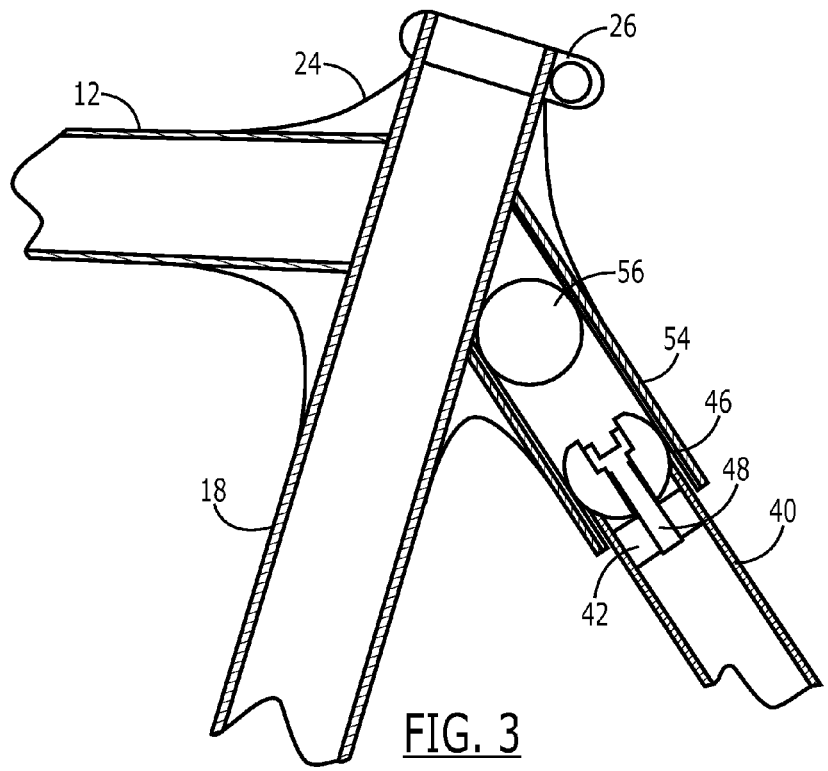
FIG. 3 is a side view of the wishbone seatstay arrangement with extensions and spherical member illustrated in FIG. 2 in a neutral position.

With reference now to FIGS. 2 and 3, seatstay arrangement 30 comprises a first portion 32, which is essentially a wishbone having a pair of seatstay tubes 34 connected together at a first end by a crown 36, and connected, preferably removably, at a second end of each to rear wheel dropouts 28. Crown 36 optionally has a hole for receiving the mounting bolt of a traditional rear caliper brake. Mounted to crown 36 is a tubular extension 40. A fitting 42 is affixed within extension 40. Fitting 42 may be a separately-formed element, secured within extension 40 by press fit, threads, solder, or other retaining means. For example, for weight savings, fitting 42 may be a lightweight plastic, titanium or similar material. Alternatively, extension 40 may be fabricated to include fitting 42 as formed. Fitting 42 is provided with a threaded region 44 so that it may ultimately serve as a nut for receiving the threaded end of an appropriately sized bolt.

Secured to the distal end of extension 40 is a low friction guide member 46, which in this embodiment is a spherical member (but may take other cross sectional configurations, as discussed further below). Member 46 will preferably be a low friction element, such as a Teflon ball. Member 46 may be a solid structure, or may be a hollow structure of sufficient strength to perform its function as described herein. Member 46 may be form of a unitary material, or may be a first material with a coating of second material (e.g., Teflon or similar low friction material) formed thereover. Member 46 will typically be non-compressive and strong enough to withstand a variety of different forces applied thereto in use. Member 46 need not be precisely spherical, and indeed may intentionally deviate from being spherical, although a nearly spherical element provides advantages discussed further below. Member 46 has formed therein a through hole 48 for receiving a bolt 50. Bolt 50 may be installed in hole 48 through member 46, securing same to fitting 42, in a direction toward the distal end of extension 40.

Alternatively (and not shown), member 46 may be provided with a threaded region for receiving a bolt, and fitting 42 be provided with a through hole such that a bolt, introduced from the proximate end of extension 40 travels through fitting 42 and threads into member 46 securing same to extension 40. In any event, a complete first section of the seatstay arrangement 30 comprises seatstay tubes 36 secured to dropouts 28 (FIG. 1), crown 36, extension 40, and member 46, with member 46 secured to extension 40 for example by bolt 50.

A second portion 52 of seatstay arrangement 30 comprises a tubular extension 54, secured for example to seat junction 24 (FIG. 1). Upon assembly, a portion of the first section of the seatstay arrangement 30 is disposed within extension 54. Specifically, the length of extension 40 is selected such that under normal loads on the frame 10, member 46 is at least partially and preferably fully disposed within extension 54. The diameters of extension 54 and member 46 are selected such that the circumferential edge of member 46 is in moveable contact with the inner wall of extension 54. That is, there should be minimal play between member 46 and the inner wall of extension 54, but with a fit allowing member 46 to travel within extension 54. Likewise, the diameter of extension 40 is selected such that under all normal operating conditions, it does not come into physical contact with extension 54 (such that extension 40 does not interfere with the intended relative motion between member 46 and extension 54).

Figure 4:
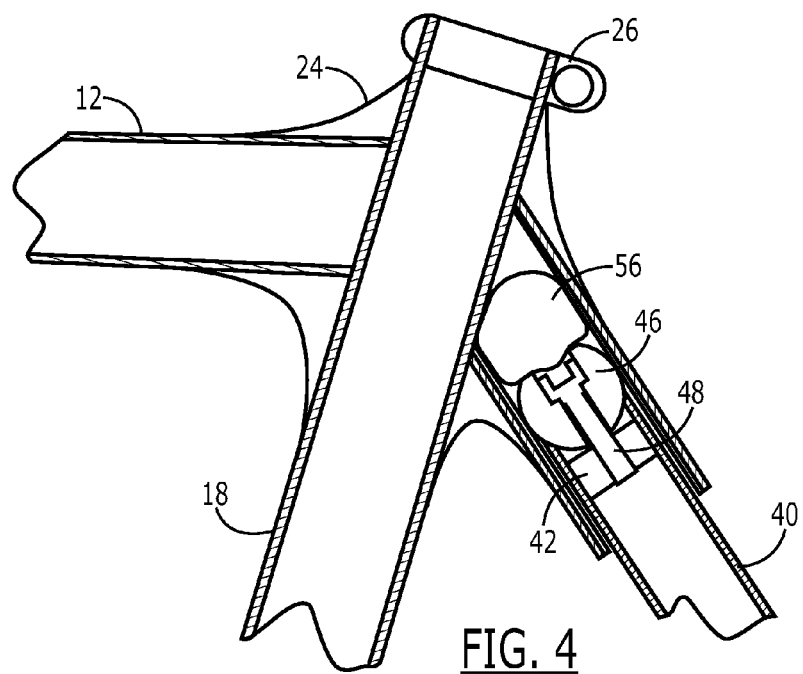
FIG. 4 is a side view of the wishbone seatstay arrangement with extensions and spherical member illustrated in FIG. 2 under load.

Optionally, a stop and/or damping member 56 may be provided within extension 54. Typically, member 56 will be fully disposed with extension 54, although other arrangements are possible. With reference to FIG. 4, member 56 limits the displacement of member 46 within extension 54 during operation of the suspended frame, for example under load. Member 56 may also serve to absorb shock and/or dampen vibration providing further effectiveness of the shock absorbing function of the present invention. Stop member 56 may have a desired surface profile, such as hemispherical, spherical, oblong, etc. Different profiles may provide different variable degrees of stopping and/or damping.

As a complete structure, member 46 and optionally a portion of extension 40 are fitted within extension 54 such that member 46 is at least substantially within the interior of extension 54. Preferably, member 46 is completely disposed within extension 54 when the cycle frame is in an uncompressed state (i.e., no rider). The relative dimensions of the elements are such that when disposed in this fashion member 46 slides with low friction but dimensional rigidity within extension 54. During use, the range of travel of member 46 within extension 54 is between the proximal opening closest to extension 40 and the distal end opposite said opening. When stop member 56 is present, the range of travel of member 46 within extension 54 is between the proximal opening and the compression limit of stop member 56. Care is taken such that the extent of travel during use does not result in interference between extension 54 and a braking device attached through attachment opening 38.

The structure therefore provides a bicycle frame 10 suspended at the rear wheel by the chainstays, which are allowed to flex vertically, as indicated by arrow A of FIG. 1. The vertical motion is controlled (limited and damped) by the seatstay arrangement 30. A very low coefficient of friction is provided between member 46 and extension 54. As the relative diameters of member 46 and extension 54 are such that member 46 is allowed to freely but controllably slide inside extension 54 along an axis without significant off-axis travel, much of the vertical motion in the direction of arrow A is transferred to motion along the direction of arrow B. The initial limiting force, or spring force, resisting motion in the direction of arrow B, and hence vertical motion in the direction of arrow A, is a moment provided by the chainstays which are pivotlessly connected to the bottom bracket structure.

Member 56 serves as a bottoming out bumper and can provide a secondary spring force resisting motion along arrow B, and hence resisting vertical motion along arrow A. The size and position of member 56 within extension 54 determines the permitted degree of motion of the chainstays in the direction of arrow B, and hence in the direction of arrow A. Optionally, the material from which member 56 is fabricated may be chosen to obtain a desired resistance to compression (illustrated in FIG. 4) and hence degree of spring force resisting motion in the direction of arrow B. Member 56 may be of unitary construction, for example providing a generally linear resistance to compressive force, or may be composed of several different layers to provide a desired resistance profile.

In this way, motion of the rear wheel (via dropout) relative to the main frame (e.g., from the terrain) is translated into motion of the spherical element within the hollow interior. The chainstays, in their pivotless arrangement, provide a moment which acts as a spring, absorbing but resisting the motion of the wheel, thereby providing shock absorption for improved ride and control.

Figure 5:
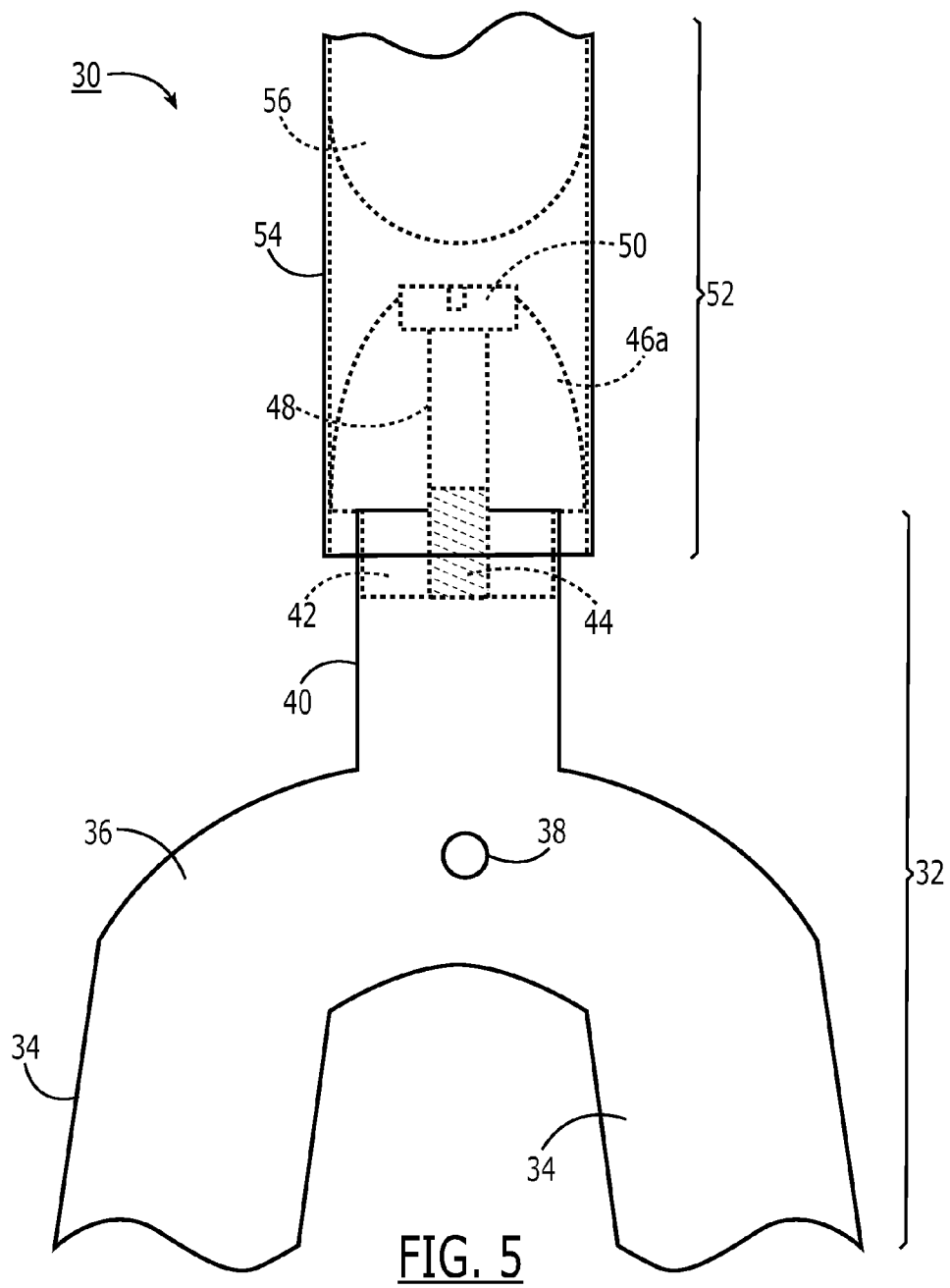
FIG. 5 is an illustration of an alternate low friction guide according to a second embodiment of the present invention.
Figure 6A:
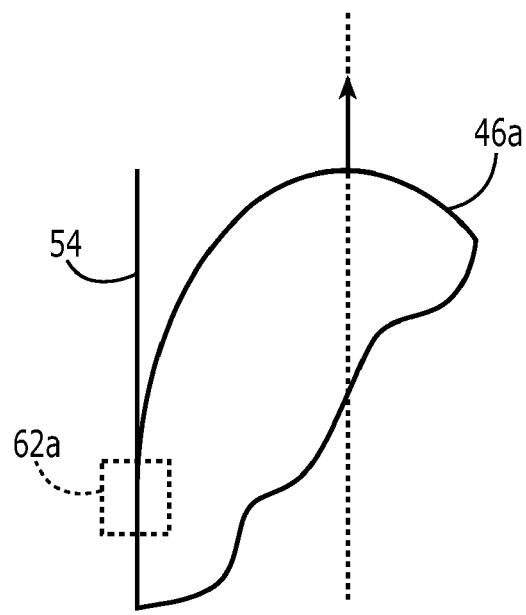
FIGS. 6A and 6B illustrate the contact surface area, within a portion of a paraboloid member when the long axis of the member is in an un-rotated position (e.g., absent a load), and when the member is rotated by an amount $\alpha$ (e.g., such as under a load condition), respectively, according to an embodiment of the present invention.
Figure 6B:
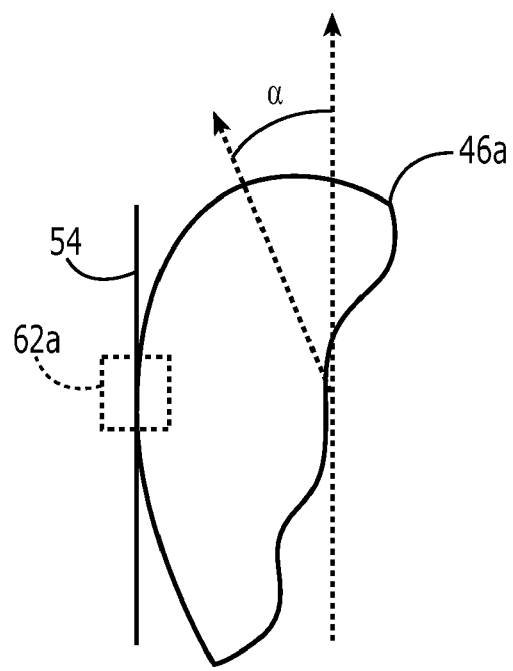

According to the embodiment described above, member 46 is a spherical element. However, many other shapes may provide an effective function for member 46. Importantly, member 46 has a minimal contact area with the hollow interior of extension 54. Additionally, given various angular displacements of member 46 under load and at rest, a body shape providing relatively uniform contact surface area regardless of angular displacement is desired. Such shapes include an ellipsoid, paraboloid, toroid, etc. FIG. 5 illustrates an example of such an alternate shape, in the form of a paraboloid member 46a. FIG. 6A illustrates the contact surface area, within rectangle 62a, of the paraboloid member 46a. FIG. 6B illustrates a similar sized contact surface area, within rectangle 62b, of the paraboloid member 46a when the long axis of paraboloid member 46a is rotated by an amount α, such as may occur under load conditions. This illustrates a desirable feature of the present invention, that the shape of low friction guide member 46 provides relatively uniform contact between seatstay arrangement 30 and extension 54 under various load conditions. Improved durability is therefore also provided in addition to improved shock absorption.

While a plurality of preferred exemplary embodiments have been presented in the foregoing detailed description, it should be understood that a vast number of variations exist, and these preferred exemplary embodiments are merely representative examples, and are not intended to limit the scope, applicability or configuration of the invention in any way. For example, the disclosure above has focused on bicycle applications. However, the present invention may find use in many other types of vehicles such as motorized cycles, tricycles, certain types of four-wheeled carts and more. Therefore, the foregoing detailed description provides those of ordinary skill in the art with a convenient guide for implementation of the invention, by way of examples, and contemplates that various changes in the functions and arrangements of the described embodiments may be made without departing from the spirit and scope of the invention defined by the claims thereto.

What is claimed is:

1. A cycle frame including a main frame section including a bottom bracket structure and a seat junction structure, a pair of chainstays connected at a first end thereof to said bottom bracket structure and at a second end thereof to rear wheel dropouts, and a wishbone seatstay arrangement comprising a pair of seatstays connected at a first end thereof to a crown and at a second end thereof pivotlessly to said rear wheel dropouts, comprising:

a first extension section fixedly attached to said crown and extending in a direction generally towards said seat junction structure;

a low friction guide component fixedly attached to said first extension section;

a second extension section fixedly attached to said seat junction section and extending in a direction towards said wishbone seatstay arrangement, said second section having a cylindrical cross section defining a hollow interior having a long axis;

wherein said low friction guide component is disposed within the hollow interior of said second extension section and such that said low friction guide component has a circumferential measure marginally less that the circumferential measure of said hollow interior of the second extension section to thereby permit motion of said low friction guide component within said hollow interior along the long axis of said hollow interior, said first extension section sized relative to said hollow interior of said second extension section such that said motion of said low friction guide component is generally not restricted by said first extension section;

whereby vertical motion of the rear wheel dropouts relative to the main frame section is translated by way of the wishbone seatstay arrangement to motion of the low friction guide component within the hollow interior of the second extension, in a direction along the long axis of the second extension, and is resisted at least in part by a moment provided by the chainstays.

2. The cycle frame of claim 1, further comprising a stop member disposed within the hollow interior of the second extension such that motion of the low friction guide component within the second extension resulting from vertical displacement of the rear wheel dropouts relative to the main frame is limited by contact between the low friction guide component and the stop member.

3. The cycle frame of claim 2, wherein said stop member has a selected elastomeric property allowing a desired degree of elasticity, and hence a desired amount of additional motion, when the low friction guide component and the stop member are in physical contact.

4. The cycle frame of claim 1, wherein said low friction guide component comprises a spherical element.

5. The cycle frame of claim 1, wherein said stop member comprises a first surface presented to said low friction guide component which is hemispherical.

6. The cycle frame of claim 1, wherein said low friction guide component and said stop member each comprise a spherical element.

7. The cycle frame of claim 3 wherein when said cycle frame is in an uncompressed state said low friction guide and said stop member are spaced apart from one another, and when said cycle frame is in a sufficiently compressed state said low friction guide and said stop member are made to be in physical contact with one another such that the elasticity of said stop member resists further compression.

8. The cycle frame of claim 1, wherein said chainstays and/or said seatstays are removably connected to said rear wheel dropouts.

* * * * *